Patented Feb. 8, 1938

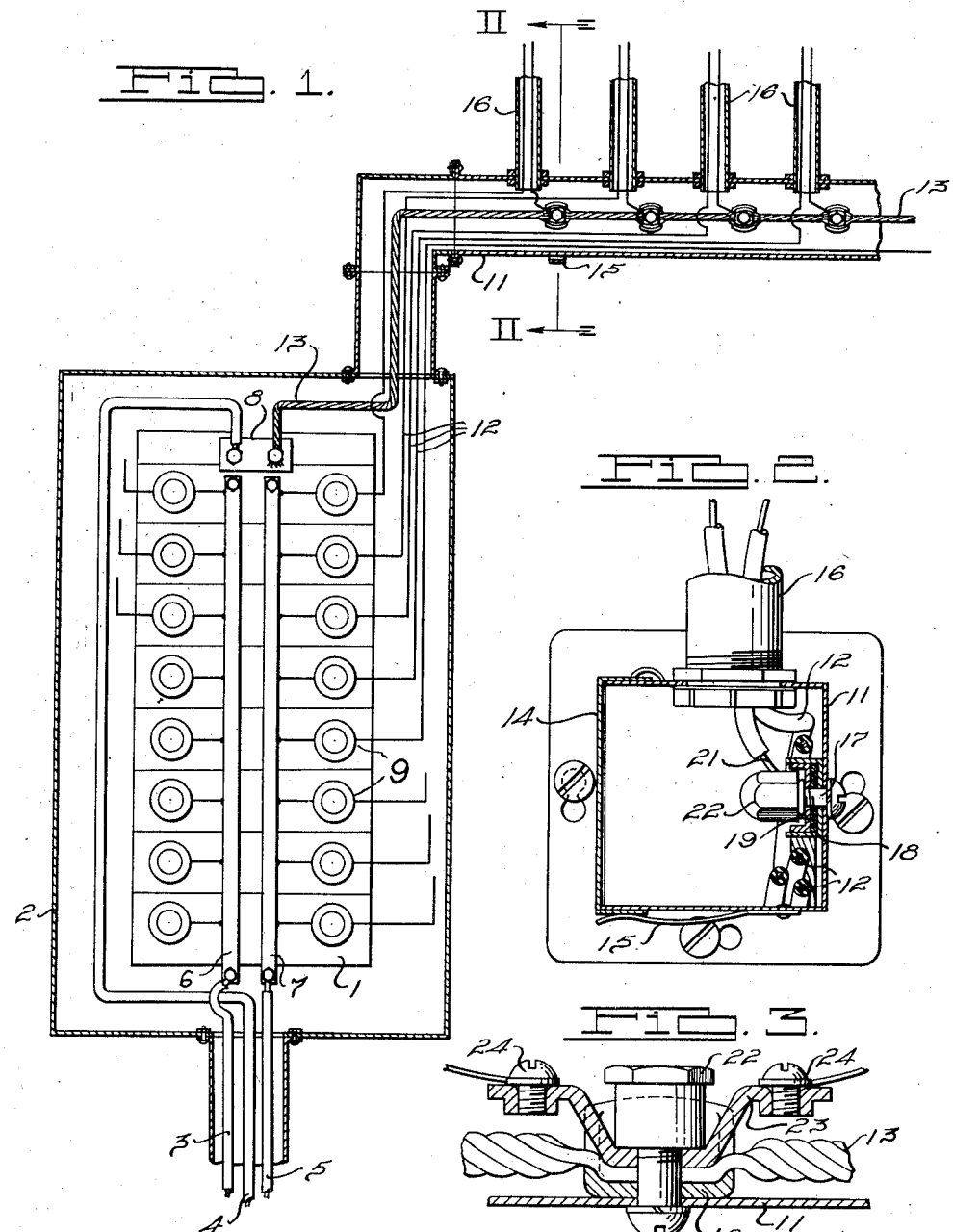

2,107,865

UNITED STATES PATENT OFFICE 2,107,865

ELECTRICAL DISTRIBUTION SYSTEM

John G. Jackson, Detroit, Mich., assignor to Square D Company, Detroit, Mich., a corporation of Michigan Application January 25, 1935, Serial No. 3,447

6 Claims. (Cl. 247—3)

This invention relates to an electrical distribution system and more particularly to a distribution system employing a readily accessible wiring duct.

One object of this invention is to provide an electrical distribution system in which a neutral conductor is carried in the wiring duct and in which the duct is provided with means affording ready access to its interior for connecting a branch wire to the neutral conductor.

Another object of this invention is to provide a distribution system for supplying a plurality of two-wire loads from a three-wire source in which the "outside" or "live" wires are connected to a distribution center from which individual branch conductors extend through a wiring duct and in which the third or neutral conductor is extended through said duct and is provided with readily accessible spaced tap-offs for the second branch wires.

Another object of this invention is to provide an electrical distribution system employing a wiring duct having removable covers and closely spaced conduit knockouts and in which the neutral conductor is extended through the duct and is provided at spaced points adjacent selected knockouts with connectors affording ready connection of branch conductors to the neutral.

Another object of this invention is to increase the number of circuits which can be supplied by a wiring duct having a limited wire-carrying capacity.

Another object of this invention is to provide a conduit for electrical conductors having a conductor therein common to a plurality of branch circuits with an improved connector for connection of the circuit wires to said conductor.

Other objects and features of the invention will be readily apparent to those skilled in the art from the following specification and appended drawing illustrating certain preferred embodiments of the invention in which:

Figure 1 is a partly schematic, sectional view of a panel cabinet and duct distribution system according to the present invention.

Figure 2 is a transverse sectional view through the wiring duct taken on line II—II of Figure 1.

Figure 3 is a detail view showing a modified form of connector.

A panel board or other distribution center of conventional form 1 is enclosed in a sheet metal cabinet 2. Line wires 3, 4, and 5 are led into the cabinet, wires 3 and 5, the "outside" or "live" wires being connected to busses 6 and 7 extending through the distribution center. The neutral or ground wire 4 is connected to an insulated conducting plate 8. The distribution panel, as is conventional in the art, embodies a plurality of fuses, switches or other circuit instrumentalities 9, one side of which are connected to one or other of the bus bars and to the other side of which a single branch circuit conductor is attached as is conventional in the art. The cabinet 2 is provided with an opening to which is bolted a section of the wiring conduit 11 which extends through the location of the load devices. The branch circuit conductors 12, each of which supplies a separate load device, extend through this duct and are led to their respective load devices. Hitherto in the art the second load circuit wires have been connected to a conducting plate similar to plate 8 and have also been led therefrom to load devices. According to the present invention, a single common neutral wire 13 is connected to conducting plate 8 and extends through the wiring duct. This duct corresponds to the form more specifically disclosed in the co-pending application of Paul S. Jenkins, Serial No. 267,592, filed April 5, 1928 and now Pat. #1,992,574. As this duct is fully disclosed therein, no attempt to again disclose it in detail is here made.

This duct is made up of sections equipped throughout their length with a plurality of closely spaced knockouts affording access to the duct at any point along its length. The duct sections are furthermore equipped with large hinged covers, as at 14 in Figure 2, latched in closed position by latch 15. The bottom of the duct may be equipped with a plurality of closely spaced small knockouts to receive the stud holding the solderless connector to be more fully described hereinafter.

Whenever it is desired to tap off from the duct to a load circuit a knockout adjacent to the load is punched out and a conduit, as at 16, is secured to the duct in a conventional manner. One of the wires 12 is then led through this conduit to the load device and the second load wire also extends through the conduit into the duct and is there attached to the common neutral 13. This neutral 13, which is at ground potential, may be either covered or bare. One manner of connecting the second load conductor to the neutral is more clearly shown in Figure 2 and embodies a stud 17 extending through one of the aforesaid small bottom knockout holes adjacent to the conduit knockout through which the corresponding conductor extends. Upon this stud is mounted a cup-shaped conducting element 18 which may take one of the forms disclosed in the co-pending application of John G. Jackson et al., Serial No. 712,068, filed February 19, 1934. The neutral 13 is led through this cup-shaped member with the strands thereof spread on either side of the stud 17. An eared washer 19 is disposed on top of the strands of cable 13 and the load conductor 21 is secured around the stud between said washer and a clamping nut 22 threaded on this stud.

A slightly modified form of connector is shown in Figure 3 which is used when it is desired to tap from two or more adjacent conduit knockouts. This connector is similar to that more specifically described in Figure 2 with the exception that instead of the washer 19 there is provided a strap 23 having a central offset portion which is seated in the cup-shaped member 18 with the clamping nut 22 directly thereover. The ends of strap 23 are each provided with one or more threaded openings into which studs 24 are threaded for securing the load conductors electrically and mechanically in place.

As the duct section is equipped with a large number of closely spaced knockouts and readily openable covers, connection may be made to the common neutral, and the single branch circuits from the distribution center may be led from the duct at any point along its length with ease.

The conduits in Figure 1 have been shown spaced very closely together due to the limitation in size of the patent drawing but it is understood that there will ordinarily be considerable spacing between these conduits corresponding to the space between the load devices. Although a single wiring duct has been shown leading from the distribution center, it is obvious any number of these may be used depending upon the number and location of the loads to be supplied, and that each will carry a common neutral conductor connected to conducting plate 8.

The advantages of this structure and system are readily apparent. The number of circuit conductors which may be carried in a wiring duct at the present time is limited by various requirements, hence any one wiring duct according to prior practice was able to serve only circuits equal in number to one-half of the permissible wire carrying capacity of the duct. According to the present invention, the number of circuits which may be supplied by the duct is almost doubled, being now equal to one less than the number of wires permissible in the duct. Another advantage of this construction is a saving in the cost of conductors since the single common neutral 13 will ordinarily be less expensive than the plurality of branch wires which it replaces. A further advantage is the saving in line loss, as the currents heretofore have been carried as entities to the common connecting plate located at the distribution center. In the present construction it can readily be seen that the individual load wires to the neutral conductor become electrically connected together within the distribution system, thus tending to at least partially neutralize each other, depending upon the value of the loads in the separate two-wire circuits and in the case of alternating current on the power factor of these loads. It is readily seen that in the classic example where the loads on separate two-wire circuits are equal and the power factor unity that the portion of the neutral connector leading from the panel cabinet will carry no current and will hence have no line loss and that in any event the line loss will be less than in the case where the neutral connections are individually made at the distribution center since the currents will tend to neutralize each other throughout the system and the neutral 13 will always be carrying less than the additive sum of the separate load currents. The chief limiting factors in the construction of panelboards and panel cabinets are the space taken up by the wires, particularly the branch wires, and the heat evolved by the parts of the circuit within the panel cabinet, about 40% of which is ordinarily attributed to the branch wires. With the construction according to the present invention, the space within the panel cabinet taken up by the branch wires is greatly lessened as is also the heat evolved by the branch wires due to the lowering of the current brought to the panel cabinet by the neutral conductor extending into the distribution system.

It is obvious that the system as specifically shown and described is readily adaptable to the supplying of three-wire loads and to the supplying of two-wire loads from a two-wire source and while these constructions will not retain all the advantages of the system as applied to the three-wire source and two-wire load, it can readily be seen that certain of the advantages will be present in these constructions.

In the drawing only a few of the branch circuit wires leading from the distribution center are shown but it is to be understood that the number of these wires will be limited only by the requirements and/or the size of the wiring duct.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. In an electrical distribution system, a wiring duct, individual branch circuit wires in said duct, a common neutral conductor in said duct, said duct having closely spaced means affording entrance into the duct and removable covers affording manual access to the interior of the duct, connectors in said duct adjacent selected means for connecting the second wire of each branch circuit to said neutral conductor, the connector for closely adjacent branch circuits having an element receiving said neutral conductor, a stud extending through the base of the element, a conducting strap with an offset portion slidable on said stud into said element over the conductor and a nut on said stud over the strap, said strap being provided with a plurality of means affording connection to branch circuit wires.

2. A wiring duct, closely spaced means in at least one wall of said duct affording entrance thereto along its length, a cable within said duct, connectors in said duct adjacent selected means for connecting branch circuit conductors to said cable, the connector for closely adjacent entrance branches comprising a cup-shaped conducting element receiving said cable, a stud through the base of said element, a conducting strap having an offset portion projecting into the element over the cable and a nut over said strap for tightly securing said cable and strap together, said strap having a plurality of means affording connection to branch conductors.

3. In a conduit for electrical conductors, means affording entrance of branch circuit wires into said conduit, a conductor within said conduit, a connector within said conduit adjacent to said entrance means, said connector comprising an element receiving said conductor, a stud through the base of said element, a conducting strap having an offset portion received in said element over said conductor and a nut on said stud over said strap, said strap being provided with a plurality of means affording connection to branch circuit wires.

4. In an electrical distribution system having a three wire source leading to a distribution center and a wiring duct leading from said center, a plurality of branch circuit conductors connected to each side of said source at said distribution center and carried within said duct, the neutral conductor being common to at least some of said branch circuits and extended past said distribution center and through said duct, at least some of said branch circuit conductors being the sole individual wires to their circuits within the duct, the other wires for said at least some of said branch circuits entering said duct and connecting to the neutral conductor adjacent to the load they supply.

5. In an electrical distribution system having a three wire source leading to a distribution center and a wiring duct leading from said center, a plurality of branch circuit conductors connected to each side of said source at said distribution center and carried within said duct, the neutral conductor being common to at least some of said branch circuits and extended past said distribution center and through said duct, at least some of said branch circuit conductors being the sole individual wires to their circuits within the duct, the other wires for said at least some of said branch circuits being connected to the neutral conductor adjacent to the load they supply, said duct being equipped with spaced means affording entrance and exit for said conductors and with removable covers of relatively large area permitting ready access to the interior of the duct for manipulation of said conductors.

6. In a distribution system supplying a plurality of two-wire loads from a three wire source, a distribution center embodying a plurality of individual circuit controlling instrumentalities connected to each of the "outside" or "live" wires of said source, a wiring duct leading from said center toward the loads to be supplied, a single branch circuit conductor for each two-wire load, each of said branch circuit conductors being connected to one of the "outside" or "live" wires through one of said instrumentalities and carried in said duct, a common neutral conductor for said branch circuits extending through said duct, the second branch circuit conductor for each of said two-wire loads being connected to said neutral conductor within the duct adjacent to the individual load to be supplied, said duct being provided with means permitting ready access to the interior of the duct for manipulation of said conductors.

JOHN G. JACKSON.